United States Patent
MeLampy et al.

(10) Patent No.: US 6,636,593 B1
(45) Date of Patent: Oct. 21, 2003

(54) MULTIPLE SYSTEM MANAGEMENT POINT NODES USING DYNAMICALLY TRANSPORTABLE LOGIC FOR SYSTEM CONFIGURATION MANAGEMENT

(75) Inventors: Patrick J. MeLampy, Pepperell, MA (US); Robert F. Penfield, Concord, MA (US); Jeffrey G. Gibson, Portsmouth, NH (US)

(73) Assignee: Priority Call Management, Inc., Wilmington, MA (US)

(*) Notice: Subject to any disclaimer, the term of this patent is extended or adjusted under 35 U.S.C. 154(b) by 0 days.

(21) Appl. No.: 09/715,301

(22) Filed: Nov. 17, 2000

Related U.S. Application Data

(63) Continuation-in-part of application No. 09/135,607, filed on Aug. 18, 1998, now Pat. No. 6,263,060.

(51) Int. Cl.[7] .................... H04M 17/00; H04M 15/00; G06F 17/30
(52) U.S. Cl. .................. 379/114.15; 379/114.03; 379/114.29; 379/229; 340/825.52; 707/10; 707/205
(58) Field of Search ............... 379/111, 112.05, 379/114.2, 114.28, 114.29, 121.06, 201.01, 201.02, 201.05, 219, 221.04, 229, 230, 114.03, 114.15; 340/825.52; 707/10, 202, 205

(56) References Cited

U.S. PATENT DOCUMENTS

| | | | |
|---|---|---|---|
| 4,439,636 A | 3/1984 | Newkirk et al. | 179/7.1 |
| 4,518,824 A | 5/1985 | Mondardini | 179/6.3 |
| 4,706,275 A | 11/1987 | Kamil | 379/144 |
| 4,860,346 A | 8/1989 | Mellon | 379/155 |
| 4,897,870 A | 1/1990 | Golden | 379/144 |
| 4,942,598 A | 7/1990 | Davis | 379/57 |

(List continued on next page.)

FOREIGN PATENT DOCUMENTS

| | | | | |
|---|---|---|---|---|
| WO | WO 91/07838 | 5/1991 | ......... | H04M/11/00 |

*Primary Examiner*—Binh Tieu
(74) *Attorney, Agent, or Firm*—Dority & Manning; Leonard W. Pojunas, Jr., Esq.

(57) ABSTRACT

A dynamic transaction network having multiple management stations, one or more terminals, and one or more databases is disclosed. The dynamic transaction network is capable of adding and removing network hosts (terminals, databases, and management stations) in real-time while continuing to service transaction requests. In addition, the dynamic transaction network is capable of transferring database fragments from a source database to a target database in real-time. In response to a transaction request from a caller, the terminal accesses information stored in a corresponding database via dynamic transportable logic. The dynamic transportable logic derives the location of relevant information in the database from input characteristic(s) of the transaction request. The transportable logic stored in the one or more terminals may be updated with transportable logic stored in the management station if a host determines that there is a difference between its transportable logic and the management station's transportable logic. A method for initializing a distributed, scalable, dynamic transaction network is disclosed as well. The method comprises: identifying each host; verifying each host has a current copy of the network configuration; updating the network configuration as required; and periodically repeating the process.

37 Claims, 14 Drawing Sheets

U.S. PATENT DOCUMENTS

| | | | |
|---|---|---|---|
| 4,975,942 A | 12/1990 | Zebryk | 379/144 |
| 5,049,873 A * | 9/1991 | Robins et al. | 340/825.06 |
| 5,155,342 A | 10/1992 | Urano | 235/380 |
| 5,163,086 A | 11/1992 | Ahearn et al. | 379/91 |
| 5,226,073 A | 7/1993 | Albal et al. | 379/91 |
| 5,359,642 A | 10/1994 | Castro | 379/121 |
| 5,386,467 A * | 1/1995 | Ahmad | 379/201 |
| 5,408,519 A | 4/1995 | Pierce et al. | 379/67 |
| 5,577,109 A | 11/1996 | Stimson et al. | 379/112 |
| 5,621,787 A | 4/1997 | McKoy et al. | 379/144 |
| 5,696,906 A | 12/1997 | Peters et al. | 395/234 |
| 5,721,768 A | 2/1998 | Stimson et al. | 379/114 |
| 5,749,075 A | 5/1998 | Toader et al. | 705/14 |
| 5,764,155 A * | 6/1998 | Kertesz et al. | 340/825.08 |
| 5,764,747 A | 6/1998 | Yue et al. | 379/210 |
| 5,872,779 A * | 2/1999 | Vaudreuil et al. | 370/352 |
| 5,937,042 A * | 8/1999 | Sofman | 379/113 |
| 5,940,478 A * | 8/1999 | Vaudreuil et al. | 379/88.18 |
| 5,966,431 A * | 10/1999 | Reiman et al. | 379/115 |
| 5,978,577 A * | 11/1999 | Rierden et al. | 395/610 |
| 5,999,610 A * | 12/1999 | Lin et al. | 379/201 |
| 6,188,761 B1 * | 2/2001 | Dickerman et al. | 379/265 |
| 6,311,186 B1 * | 10/2001 | MeLampy et al. | 707/10 |

* cited by examiner

MULTIPLE SYSTEM MANAGEMENT POINT NODES USING DYNAMICALLY TRANSPORTABLE LOGIC FOR SYSTEM CONFIGURATION MANAGEMENT

CROSS-REFERENCE TO RELATED APPLICATION

The present application is a continuation-in-part application and claims the benefit of U.S. patent application, issued Ser. No. 09/135,607, filed Aug. 18, 1998, now U.S. Pat. No. 6,263,060, and titled, "Transportable Logic to Facilitate a Large Calling Card Transaction Network Supporting Dynamic Changes," which is hereby incorporated by reference in its entirety.

FIELD OF THE INVENTION

The present invention generally relates to data network management. More specifically, the invention relates to a system and method for real-time network system configuration management.

BACKGROUND OF THE INVENTION

Real-time transaction processing networks are generally comprised of two major components as follows: transaction entry terminals (such as clients in a client-server computer network) and transaction management databases (servers). Transaction networks utilize different kinds of terminals and databases for different industries, such as banking and telecommunications. However, unlike the world's financial systems, no industry-wide standards have been adopted for network inter-operability in the calling card industry.

Currently available calling card transaction networks typically use telephones coupled via one or more voice networks to voice processing systems integrated within a transaction entry terminal. Calling card service users may be prompted by the integrated voice processing system for an account or personal identification number (PIN). Some systems have the optional capability to prompt the user for a password in addition to the user's PTN. Large databases for transaction management may be used to validate both the account and the account balance, and may be configured to prevent simultaneous use of an individual's account. Typically, account numbers are pre-assigned by the operator of the calling card service. Conversely, PINs are randomly assigned and in most systems user configurable. Since there is no widely accepted standard for assigning account and PIN numbers, integrating various calling card networks to inter-operate has proven extremely difficult for the telecommunication industry.

With the advent of pre-paid calling card (PPCC) services, database servers have been adapted to manage an active balance with provisions to prevent the account balance from accruing a negative balance. The popularity of pre-paid calling cards and similar vouchers that may be sold and distributed by retailers can result in "active" accounts that can number in the tens of millions. The full-time on-line nature of these services and the resources required to support and manage real-time customer account data that may result from the active account pool provide an additional area of concern for PPCC service providers. Due to limitations in database and computer processing technology, often multiple databases operated by multiple database servers are required to manage the real-time call transaction volume, leading to inter-operability and data accuracy problems.

While the above issues are problematic for traditional transaction processing networks, they are particularly difficult to overcome in PPCC networks because of the real-time aspects of both account balance and transaction management. As a direct result, it is nearly impossible to restructure a PPCC database off-line, and then post transactions to catch up to real-time as is the practice in "post-pay" or legacy-based financial accounting situations. Furthermore, it is problematic to add and reconfigure PPCC database servers to PPCC networks.

As a result, there is a need for improved network system configuration management and data transferability to support database server expandability to accommodate growing transaction and data volume in the calling card industry and related computer networks.

SUMMARY OF THE INVENTION

In light of the foregoing, the invention is an improved system and method for real-time network system configuration management and data transferability that may be applied in the PPCC industry and in related real-time computer networks that process transactional data.

An improved system for real-time network system configuration management and data transferability in accordance with the present invention may comprise a plurality of system management points, at least one transaction terminal, and at least one database server.

The present invention can also be viewed as providing a method for providing real-time addition and configuration of the various components that may comprise a real-time transaction network. In this regard, the method can be broadly summarized by the following steps: connecting at least one management station, at least one database and at least one terminal; identifying each host on the dynamic transaction network; updating a network configuration stored by the at least one management station in response to the identified hosts; and using a transportable logic to notify network hosts of network configuration changes.

Other objects, features, and advantages of the present invention will become apparent to one skilled in the art upon examination of the following drawings and detailed description. It is intended that all such additional objects, features, and advantages be included herein within the scope of the present invention, as defined by the claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

GLOSSARY OF TERMS AND ACRONYMS

Figure 1:
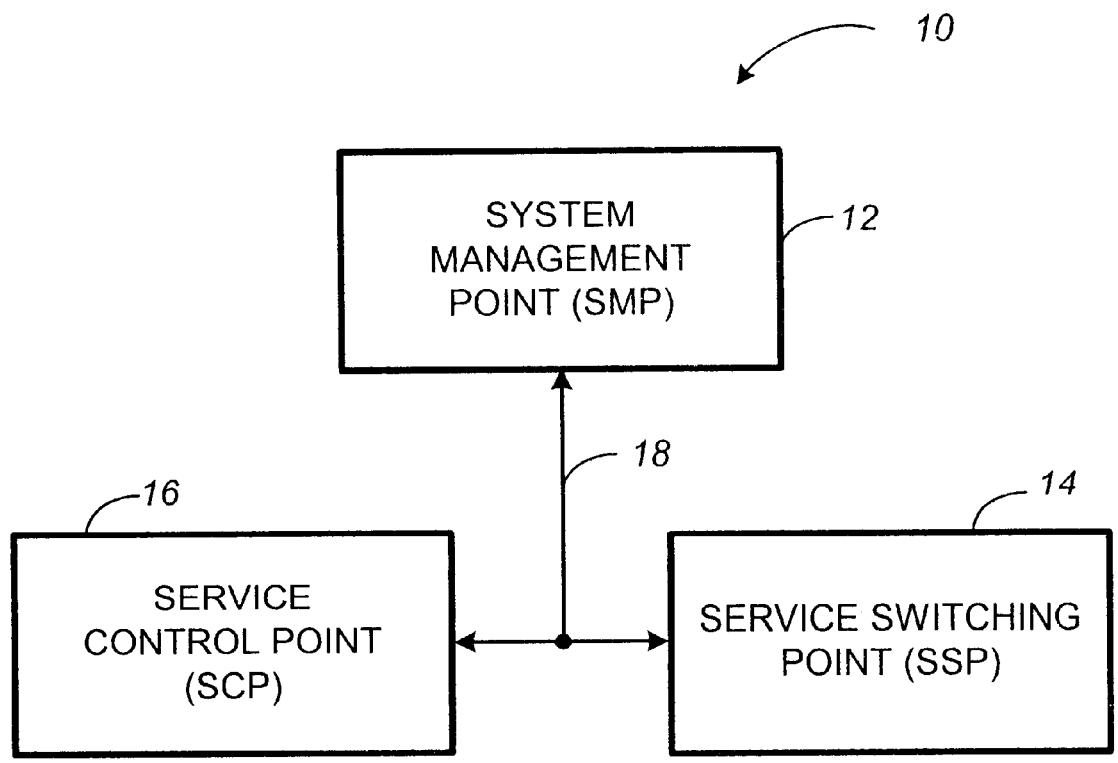
FIG. 1 is a block diagram illustrating the various functional elements that may comprise a basic transactional network configuration.

The following definitions and acronyms will assist the reader in comprehending the following detailed description of the preferred embodiments of an improved system and method for real-time network system configuration management and data transferability in accordance with the present invention.

| | |
|---|---|
| ANI | Automatic Number Identification; |
| CJN | Configuration Journal Number; |
| DNIS | Dialed Number Identification System; |
| DTL | Dynamic Transportable Logic; |
| DTMF | Dual Tone Multi-Frequency; |
| IE | Information Element; |
| IEC | Information Element Collection; |
| IP | Internet Protocol; |
| OCN | Originally Called Number; |
| OLTP | On-Line Transaction Processing; |
| PIN | Personal Identification Number; |
| PPCC | Pre-Paid Calling Card; |
| SCP | Service Control Point; |
| SMP | System Management Point; |
| SSP | Service Switching Point; |
| SS7 | Signaling System Seven; |
| Datagram | A unit of data transferable via a network protocol across network connected hosts; |
| Fragment | A "sub-section" of a database; |
| Host | A single computing element; |
| Cluster | A group of computing elements; |
| Network | A group of clusters, interconnected to comprise an operational system. |

DETAILED DESCRIPTION OF THE PREFERRED EMBODIMENTS

A brief discussion of the term "database fragments" is required to understand operation of the present invention. A database fragment is a "logical section" of a database. Thus, a single data server may initially serve hundreds of "logical fragments," which may ultimately grow to occupy a plurality of data servers. Thus, each data unit or fragment may, over time, be moved from one physical server to another, or to a plurality of servers. The determination of which data fragment to access at a given time is part of the functionality of dynamic transportable logic (DTL). Thus, where each host processing the DTL has a plurality of inputs and outputs, at least one of the outputs comprises a "logical fragment" address to use for database functionality.

Another significant term worthy of preliminary explanation is "transaction network." A transaction network may comprise three functional building blocks: the management station or SMP (System Management Point), the terminal or SSP (Service Switching Point), and the database or SCP (Service Control Point). The SMP may serve as the central network configuration manager for a transaction network. The SMP may provide central control and distribution of all DTL and network topologies. Additionally, the SMP may provide monitoring and control functionality. SSPs may comprise voice network switches, which may serve as an entry point for services offered in a PPCC network. The SCPs may comprise distributed databases that may be used to control and dictate the services provided during transactions. These three pieces may function together to embody a distributed scalable real-time transaction network. Operation of such a network, and how it provides dynamic management and real-time transaction processing, is described in detail below.

Turning now to the drawings, wherein like reference numerals designate corresponding parts throughout the drawings, FIG. 1 is a block diagram illustrating the various functional elements that may comprise a basic transaction network configuration. As illustrated in FIG. 1, a basic transaction network configuration 10 may comprise a system management point (SMP) 12, a service switching point (SSP) 14, and a service control point (SCP) 16. As further illustrated in FIG. 1, each of the aforementioned functional elements may be interconnected via a communication medium 18 as shown. The basic transaction network configuration 10 as shown in FIG. 1 may be the initial configuration encountered upon initialization of a real-time dynamically configurable transaction network. Those skilled in the art of networking will appreciate that messages may be sent both to and from each of the SMP 12, the SSP 14, and the SCP 16 via the communication medium 18 in order to enable each of the functional elements to function together. Messages on the network are assumed to result from a reliable datagram method, such as the method discussed in W. Richard Stevens, UNIX Network Programming, Prentice Hall, 1990, pp 405–419, incorporated herein by reference thereto.

Figure 2:
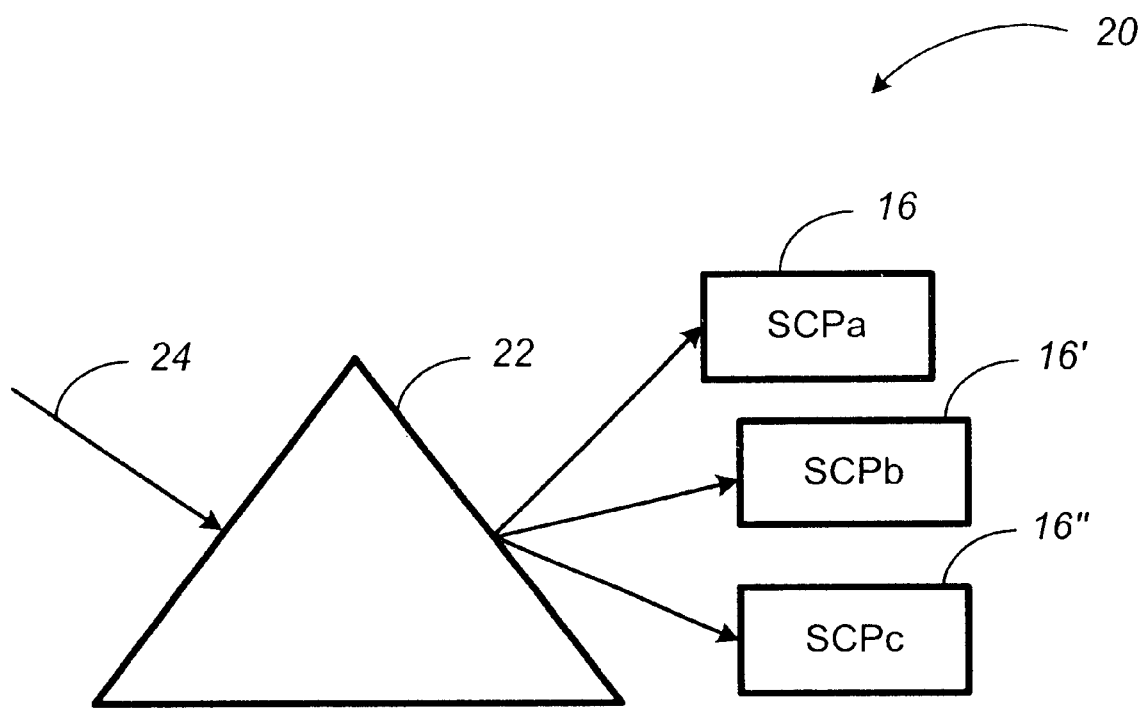
FIG. 2 is a diagram illustrating the operation of dynamic transportable logic that may be applied by the basic transactional network configuration of FIG. 1.

Having described a basic transaction network configuration with regard to the block diagram of FIG. 1, reference is now directed to FIG. 2. In this regard, FIG. 2 is a diagram illustrating the operation of dynamic transportable logic that may be applied by the basic transactional network configuration of FIG. 1.

Referring now to FIG. 2, a "prism" diagram 20 illustrating the functionality of DTL as may be processed by a host (not shown). As illustrated in FIG. 2, a "prism" diagram may comprise a DTL element 22 and one or more SCPs herein designated as SCPa, SCPb, SCPc, 16, 16', and 16", respectively. As further illustrated in FIG. 2, the DTL element 22 may be configured to direct an incoming transaction 24 to one or more of the various SCPs 16, 16', 16" on a network (not shown) in response to identifying characteristics that may be related to the incoming transaction 24. More specifically, by way of non-limiting examples, the DTL element 22 may use one or more of the following input characteristics to direct the incoming transaction 24 to one or more designated database servers or SCPs 16, 16', 16". An Automatic Number Identification (ANI) which provides the source number of an inbound call to the host SSP; a Dialed Number Identification System (DNIS) code that provides the number dialed by the caller to reach the host SSP; an originally called number (OCN) that provides a number dialed before the call arrived at the host SSP; a PIN or account number as entered by a user; a physical port or circuit that a call traverses; information digits that may provide an indication of what kind of terminal the caller is dialing from (e.g., a pay phone, hotel phone, or prison phone). It should be noted that the aforementioned OCN is often referred to as a Redirect Number. It should be further noted that the PIN or account number is usually entered via DTMF or spoken words processed into digits by the SSP 14 (see FIG. 1).

When determining which path or paths to direct the incoming transaction 24, the DTL element 22 may generate a number of output signals. One output signal (not shown) may comprise a logical fragment address in the form of an integer value denoting a database location in which a record, necessary for the transaction, resides. Another output signal (not shown) may be in the form of an account or PIN number that comprises a digital database key that allows a transaction to gain access to records in a database. A further output signal (not shown) may be an optional password containing a user changeable PIN or account number in the form of an embedded code. It should be noted, however, that the optional password is not part of the database key.

The DTL element 22 preferably has built in decryption and check sum mechanisms to prevent invalid transactions from ever reaching the SCPs 16, 16', 16". Since the database key and the database fragment location are determined by the DTL element 22 and checksums and decryption are included in the DTL element 22, the final transaction can be private key encrypted for transport to the SCPs 16, 16', 16" in order to securely use a public network to transport the incoming transaction 24 to the appropriate SCPs 16, 16", 16".

It is important to recognize that a key mechanism for utilizing the distributed database technology of the present invention is a combination of distributing and managing the configuration data, as well as distributing and utilizing the DTL for interfacing with the transaction network. The DTL of the present invention is best described as a dynamically replaceable "prism" which refracts the incoming rays or transactions to their correct locations during network operation.

Several computer languages such as Sun Microsystem's JAVA have been developed to distribute executable logic from servers to clients for execution. The DTL envisioned and described herein for use with present invention has similar functionality. In fact, Java would be an excellent candidate for this role. Other available computer languages, which may be used to support various DTL functionality, include Perl Penquin, Bell Labs Interferon, and ActiveX from Microsoft. Substitution and inclusion of any of these languages to support the various methods of DTL distribution will be appreciated by those skilled in the art.

Figure 3:
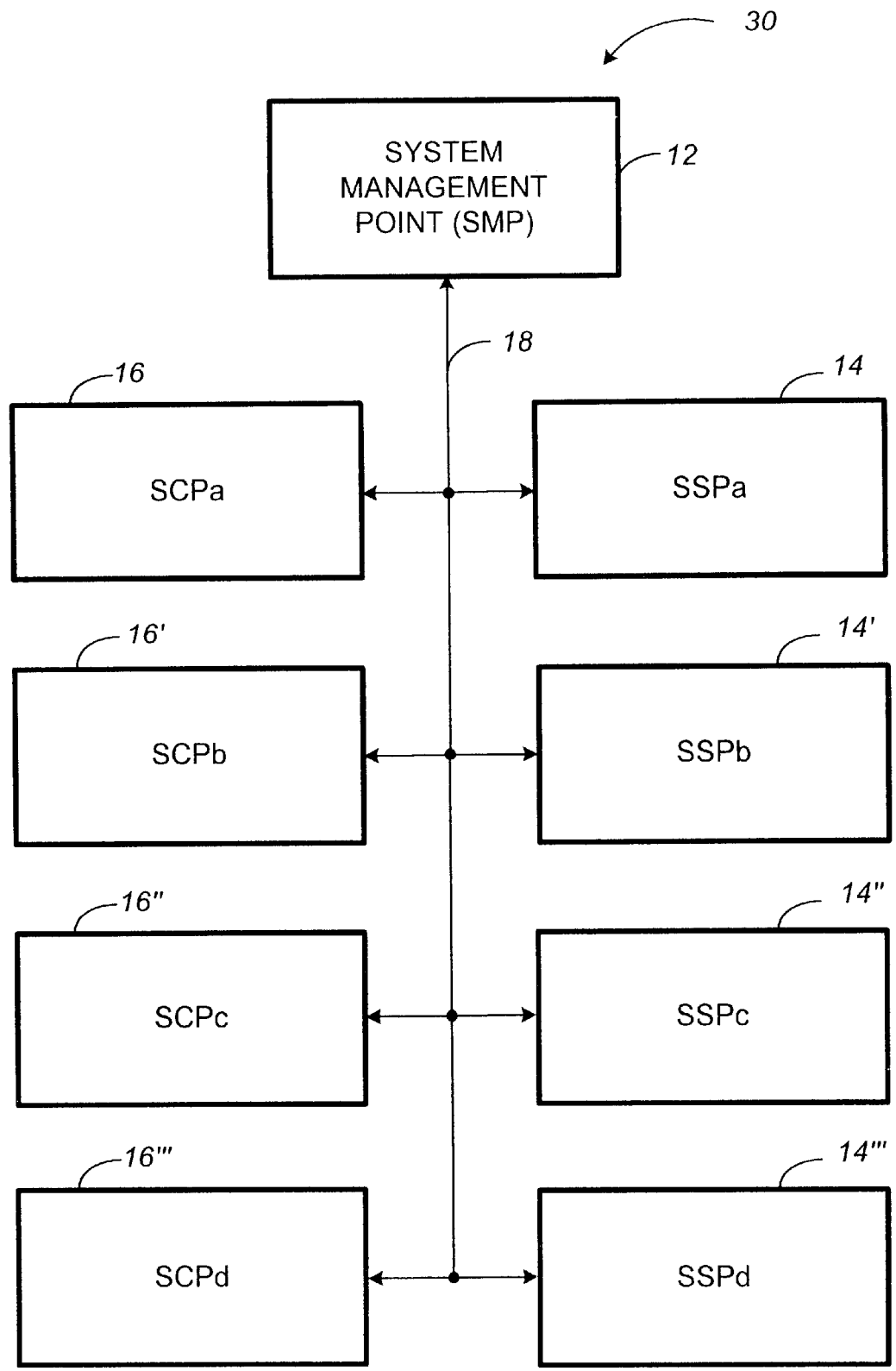
FIG. 3 is a block diagram illustrating a transactional network that may apply the dynamic transportable logic introduced in FIG. 2.

Having described the operation of dynamic transportable logic that may be applied by a basic transaction network to update both network configuration information and database fragments with regard to the "prism" diagram 20 of FIG. 2, reference is now directed to FIG. 3. In this regard, FIG. 3 is a block diagram illustrating a transactional network that may apply the dynamic transportable logic introduced in FIG. 2.

Referring now to FIG. 3, a transaction network configuration 30 illustrating the extension of the basic transaction network configuration 10 of FIG. 1, may comprise a SMP 12, a plurality of SSPs herein designated SSPa, SSPb, SSPc, and SSPd 14, 14', 14", and 14"', respectively, and a plurality of SCPs herein designated SCPa, SCPb, SCPc, and SCPd 16, 16', 16", and 16"', respectively. As further illustrated in FIG. 3, each of the aforementioned functional elements may be interconnected via a communication medium 18 as shown. As will be explained hereinafter with regard to FIGS. 6–10, each of the SSPs 14, 14', 14", and 14"' and each of the SCPs 16, 16', 16", and 16"', may be added to a real-time network and configured to apply the appropriate version of the DTL to the appropriate database fragments in order to realize a real-time transaction network.

Figure 4:
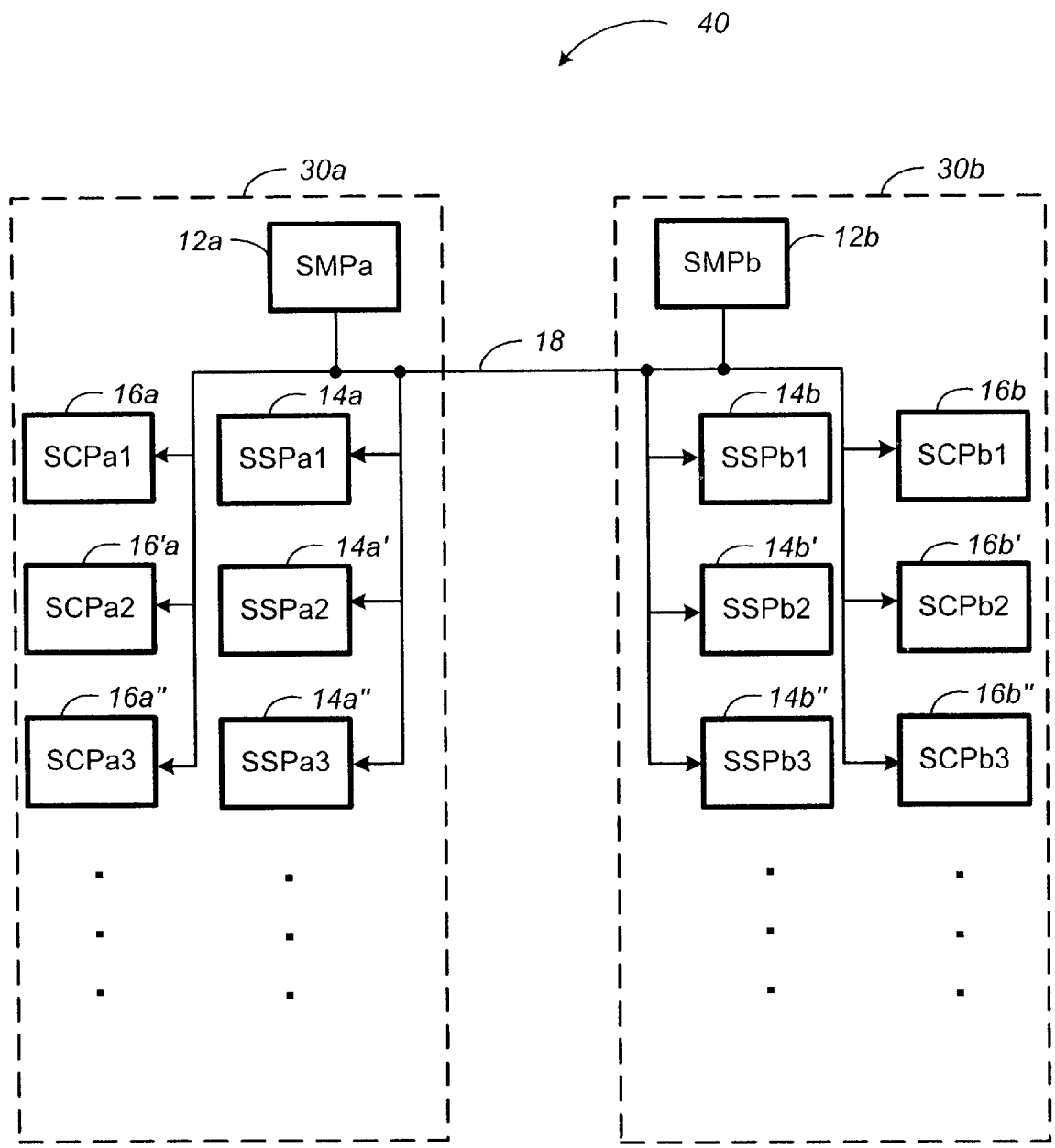
FIG. 4 is a block diagram illustrating the inter-networking of two similarly configured transactional networks of FIG. 3.

Having briefly described a transaction network configuration 30 that may be used to extend the basic transaction network configuration 10 with regard to FIG. 3, reference is now directed to FIG. 4. In this regard, FIG. 4 is a block diagram illustrating the inter-networking of two similarly configured transaction networks of FIG. 3.

Referring now to FIG. 4. FIG. 4 illustrates the internetworking of two separate transaction networks in accordance with the improved system and method for real-time network system configuration management and data transferability of the present invention. In this regard a multi-network configuration 40 may comprise a first transaction network 30a and a second transaction network 30b. As further illustrated in FIG. 4, the first transaction network 30a may comprise a SMP 12, a plurality of SSPs herein designated SSPa1, SSPa2, and SSPa3, 14a, 14a', and 14a", respectively, and a plurality of SCPs herein designated SCPa1, SCPa2, and SCPa3 16a, 16a', and 16a", respectively. As further illustrated in FIG. 4, each of the aforementioned functional elements that comprise the first transaction network 30a may be interconnected via a communication medium 18 as shown. Similarly, the second transaction network 30b may comprise a SMP 12, a plurality of SSPs herein designated SSPb1, SSPb2, and SSPb3, 14b, 14b', and 14b", respectively, and a plurality of SCPs herein designated SCPb1, SCPb2, and SCPb3 16b, 16b', and 16b", respectively. As further illustrated in FIG. 4, each of the aforementioned functional elements that comprise the second transaction network 30b may be interconnected via a communication medium 18. Furthermore, those skilled in the art will appreciate that the multi-network configuration 40 may be extended by adding SCPs and SSPs as required by transaction network user demands.

It is significant to note that while both the first transaction network 30a and the second transaction network 30b are illustrated as "mirror" images of one another, there is no requirement or limitation that each of the individual networks comprising a multi-network configuration 40 be configured with equal numbers of SCPs 16, 16', 16" and SSPs 14, 14', and 14". Similarly, there is no requirement that the configuration of the first transaction network 30a "mirror" the configuration of the second transaction network 30b. Furthermore, while FIG. 4 illustrates the internetworking of two separate transaction networks 30a and 30b, respectively, there is no limit on the number of transaction networks that may be integrated to support the improved system and method for real-time network system configuration management and data transferability in accordance with the present invention. As will be explained hereinafter with regard to FIGS. 6–10, each of the SSPs 14a, 14b, 14a', 14b', 14a", and 14b" and each of the SCPs 16a, 16b, 16a' 16b', 16a", and 16b" illustrated in FIG. 4 may be added to a real-time network and configured to apply the appropriate version of the DTL to the appropriate database fragments in order to realize a real-time transaction network.

Figure 5:
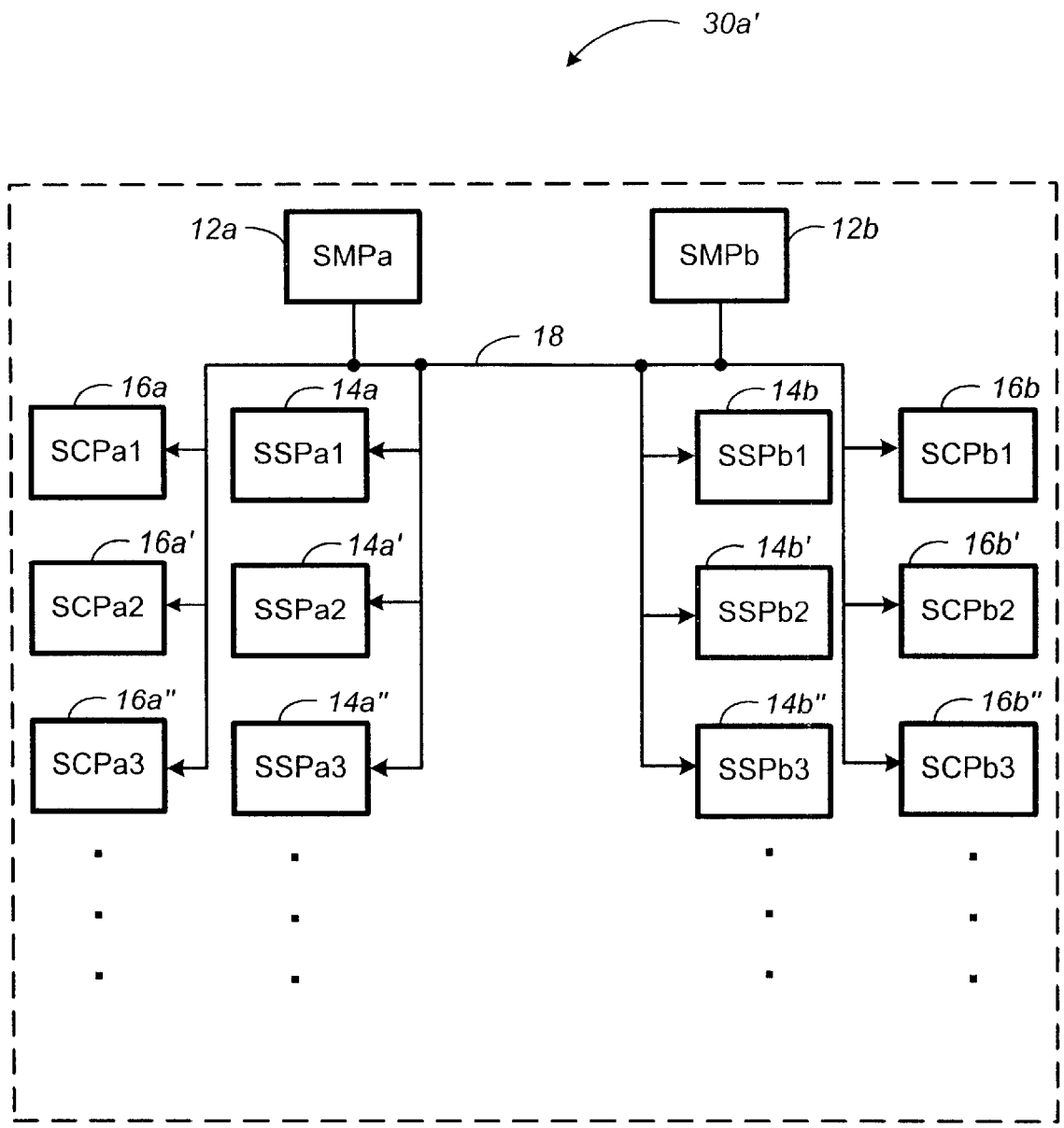
FIG. 5 is a block diagram illustrating the integration of the transactional networks of FIG. 4 in a multi-system management point transactional network.

Having briefly described a multi-network configuration 40 with regard to FIG. 4 that may be used to further extend a transaction network configuration 30 as introduced in FIG. 3, reference is now directed to FIG. 5. In this regard, FIG. 5 is a block diagram illustrating the integration of the multi-network configuration of FIG. 4 in a multi-system management point (SMP) transaction network.

Referring now to FIG. 5. A multi-SMP transaction network 30a' in accordance with the improved system and method for real-time network system configuration management and data transferability in accordance with the present invention is shown. In this regard, a multi-SMP transaction network 30a' may comprise a first SMPa 12a and a second SMPb 12b, as well as, SSPs, 14a, 14b, 14a', 14b', 14a", and 14b" and SCPs 16a, 16b, 16a' 16b', 16a", and 16b" as required to support transaction network system user demands. As further illustrated in FIG. 5, the multi-SMP transaction network 30a' may comprise a first network branch of SMPa 12a, SSPa1 14a, SSPa2 14a', SSPa3 14a", SCPa1 16a, SCPa2 16a', and SCPa3 16a". Similarly, a second network branch may comprise a SMPb 12b, SSPb1 14b, SSPb2 14b', SSPb3 14b", SCPb1 16b, SCPb2 16b', and SCPb3 16b". As further illustrated in FIG. 5, each of the aforementioned functional elements that comprise the first and second network branches of the multi-SMP transaction network 30a' may be interconnected via a communication medium 18.

Figure 6:
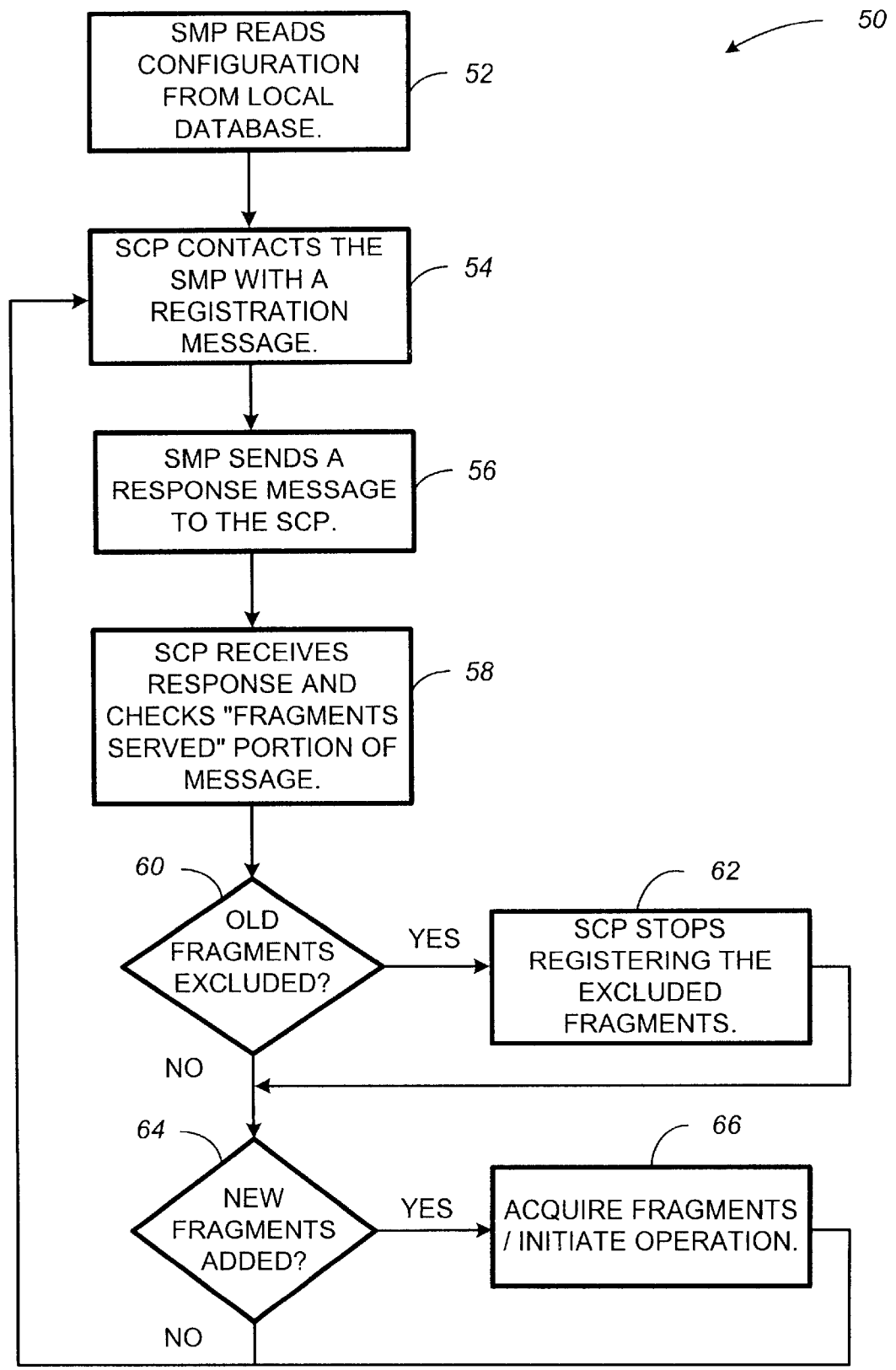
FIG. 6 is a flowchart illustrating a method for configuring a service control point that may be integrated in either of the transactional network topologies of FIGS. 3–5.

Having introduced and briefly described the various transaction network topologies of FIGS. 3–5, reference is now directed to FIG. 6. In this regard, FIG. 6 is a flowchart illustrating a method for configuring a SCP that may be integrated in the transaction network topologies of FIGS. 3–5.

As illustrated in FIG. 6, a method for configuring a SCP 50 is introduced. Upon initialization of a transaction network the SMP may be configured to read network configuration information from a local database, as shown in step 52. After reading the network configuration, the SMP may be ready to receive messages from each of the various interconnected devices on the transaction network. As illustrated in step 54, a SCP may contact the SMP with a registration message or "PING" using a reliable datagram. It should be noted that the SCP may periodically contact the SMP via a PING to ensure that the SCP is storing all necessary configuration data, as described in further detail below. The PING or message may comprise a list of the data fragments supported by the SCP, as well as operational statistics related to the SCP for system monitoring purposes. The list of supported fragments may be in the form of a registration message indicating which database services are supported by the SCP. The operational statistics may include, as by way of non-limiting examples, transactions per second, available memory, and alarm data. The PING may also include a Configuration Journal Number (CJN) that represents the number of configuration transactions that have occurred since network system initialization. The CJN may be used as an indicator to verify that each of the hosts on a transaction network are synchronized as it relates to the current configuration state of the distributed transaction network.

Next, at step 56, the SMP may respond to the SCP with a message containing a complete list of SCPs (including database servers and their addresses), information about which "fragments" of the account population are served, the current service state of each server, and a CJN, which can be used to check the accuracy of the distributed configuration data. The message also preferably includes a complete list of the SSPs connected to the dynamic transaction network, as well.

After the SCP receives the response from SMP, the SCP, at step 58, may be configured to check the "fragments served" portion of the response against the SCP's local record. If a determination is made in step 60 that the fragments served have changed to exclude old fragments, then the SCP may stop registering the excluded database fragments as illustrated in step 62. If the determination in step 60 is negative, that is, no old fragments are excluded, then processing continues with the query of step 64.

As illustrated in step 64, if it is determined that new database fragments have been added to the configuration, then an "acquire fragment" operation is initiated as illustrated in step 66. The "acquire fragment" operation is directed to the previous owners (SCPs) of the new fragments. If the determination in step 64 is negative, that is, no new fragments have been added or designated for control under the present SCP, processing control is returned to step 54 as illustrated in FIG. 6. The SCP may periodically repeat steps 54–66 as further illustrated to ensure that the SCP is storing all necessary configuration data, i.e., whether the SCP should stop registering excluded database fragments and/or acquire new database fragments.

Figure 7:
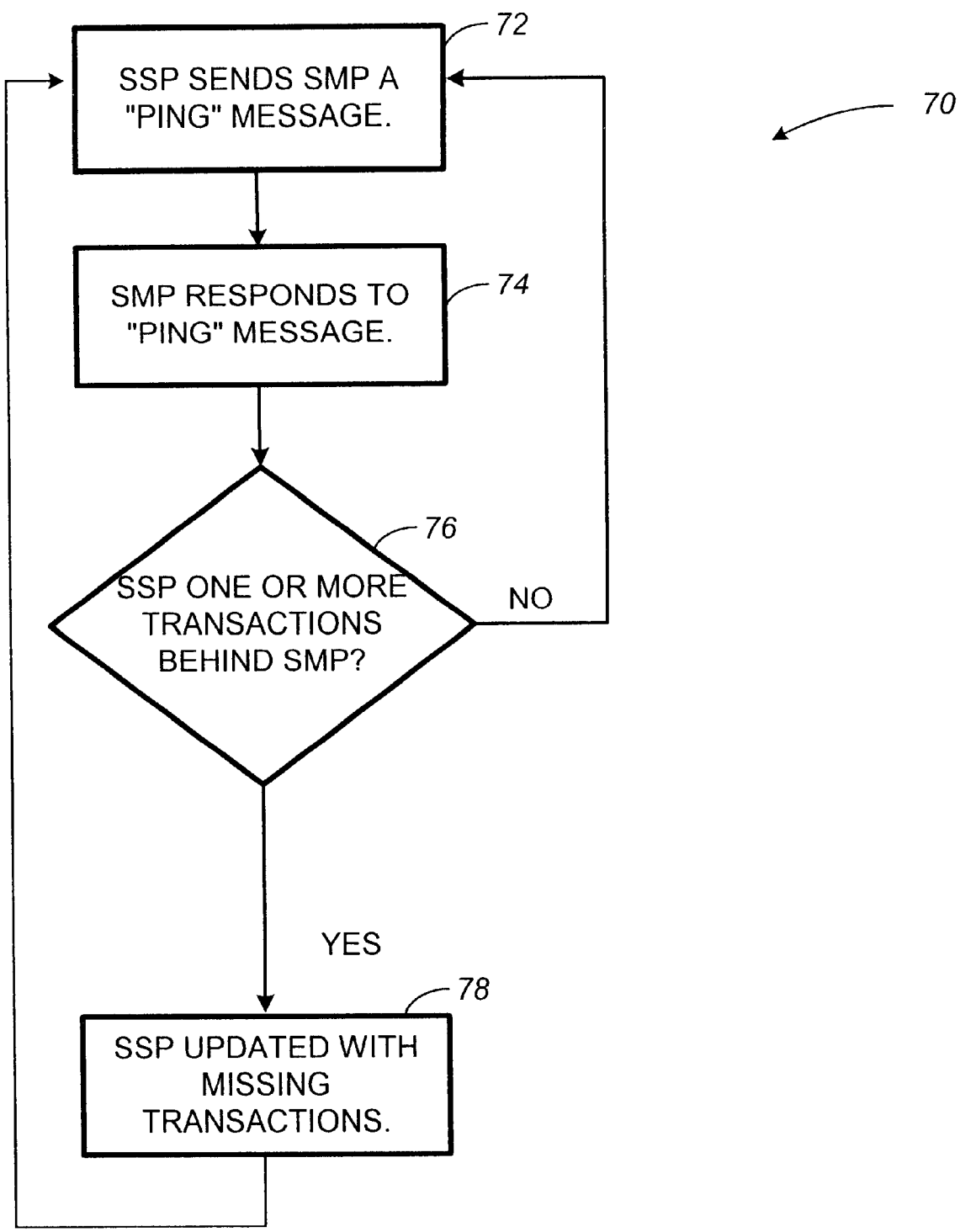
FIG. 7 is a flowchart illustrating a method for configuring a service switching point that may be integrated in either of the transactional network topologies of FIGS. 3–5.

Having described the method for configuring a SCP 50 with regard to the flowchart of FIG. 6, reference is now directed to FIG. 7. In this regard, FIG. 7 is a flowchart illustrating a method for configuring a SSP that may be integrated with the transaction network topologies of FIGS. 3–5.

Referring now to FIG. 7, a flowchart representing a method for configuring a SSP 70 that may be integrated in the transaction network topologies of FIGS. 3–5 is illustrated. As shown in step 72, the SSP may be configured to contact the SMP with a PING message. The PING message may include operational statistics for monitoring purposes. The operational statistics may include, but are not limited to, calls per hour, memory available, disk space, and alarms. The PING message may also comprise a CJN indicating the number of configuration transactions that have occurred since network initialization. As previously explained hereinabove, the CJN can be used to check the accuracy and completeness of the distributed configuration data.

Next, at step 74, the SMP may respond to the SSP's PING message with a CJN, a complete list of database servers (SCPs) and their network addresses, an indication of which "fragments" of the account population are served, the current service state of each fragment, and a complete list of the SSPs connected to the transaction network.

Afterwards, at step 76, the SSP may be configured to determine if the local configuration status is one or more transactions behind the SMP. This step may be accomplished by comparing the CJNs at the SMP and the SSP. If the SSP configuration is synchronized with the SMP, the SSP returns to step 72 as illustrated and may be configured to transmit a PING message to the SMP after the lapse of a predetermined period of time. If the SSP configuration is not synchronized with the SMP configuration, as determined in step 76, the SSP may be configured to send a request to the SMP for the missing journal entries (step not shown). After the SMP replies with the missing journal entries, the SSP may be updated with the missing transactions as shown in step 78. The journal entries are preferably applied to the local database and served to other hosts on the cluster, thereby ensuring that all hosts (computing entities) in all clusters store an identical copy of the configuration database. After updating is complete, the SSP may return to step 72 where a PING message may be generated and transmitted via the communication medium 18 (see FIGS. 3–5) to the SMP after the lapse of a predetermined period of time.

The above-described process may repeat continuously, with a prescribed interval having a programmable length between PING messages. The latency of configuration data updates is therefore based solely upon the frequency of the PING message. It should be noted that each of the SCPs in communication with the transaction network may also use the method illustrated in FIG. 7 to keep the locally stored network configuration information up to date for each of the SCPs.

Figure 8:
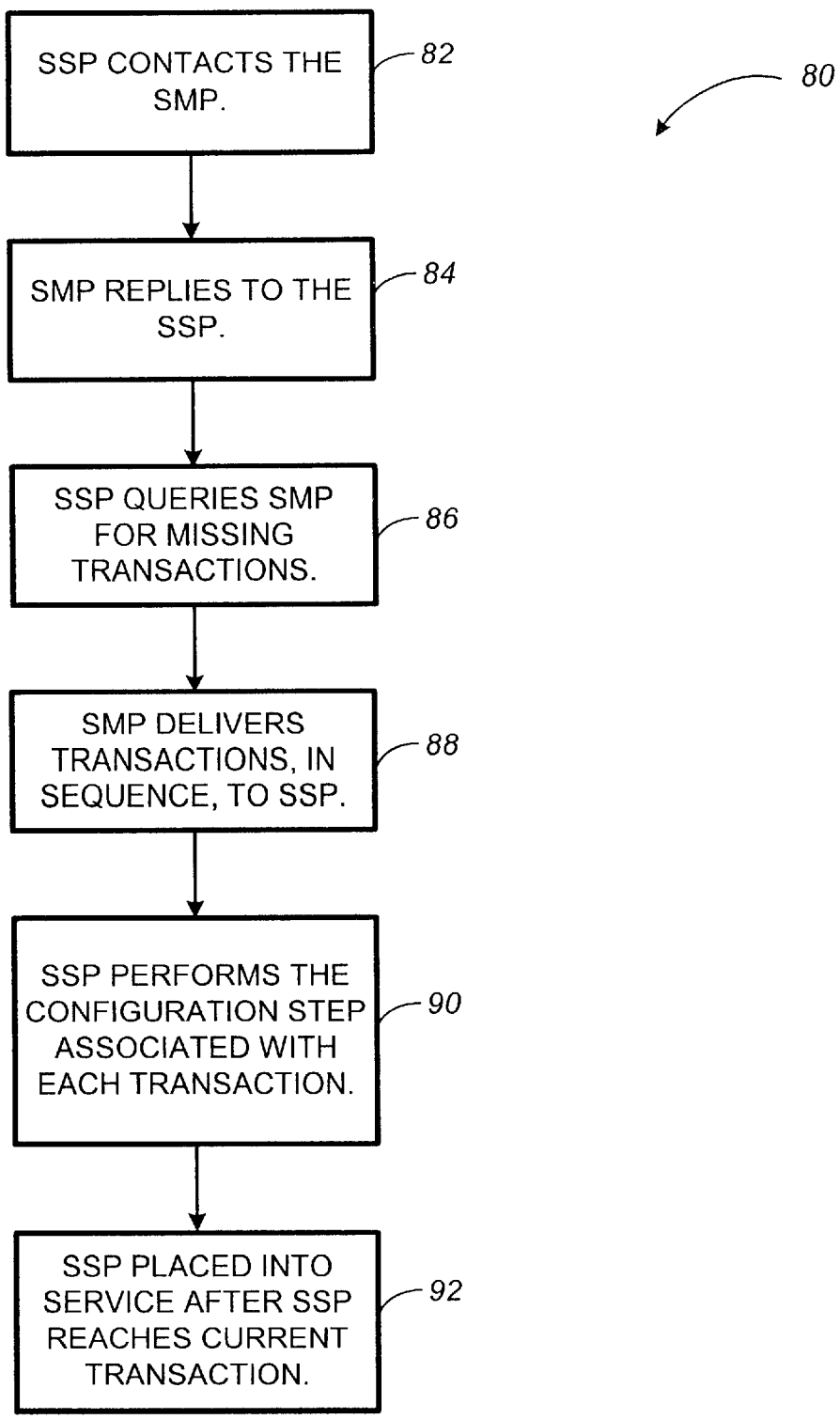
FIG. 8 is a flowchart illustrating a method for adding a service switching point that may be integrated in either of the transactional network topologies of FIGS. 3–5.

Having described the method for configuring a SSP 70 that may be integrated with the transaction network topologies of FIGS. 3–5 with regard to the flowchart of FIG. 7, reference is now directed to FIG. 8. In this regard, FIG. 8 is a flowchart illustrating a method for adding a SSP that may be integrated with the transaction network topologies of FIGS. 3–5.

Referring now to FIG. 8, a method for adding a new SSP 80 (transaction terminals) to a transaction network is shown. The newly added SSP (e.g., computing entity or cluster) does not need to have any particular configuration prior to integration of the SSP into the dynamic transaction network. First, at step 82, the new SSP initiates contact with the SMP by transmitting a journal entry number of zero, indicating no configuration, to the SMP. Next, at step 84, the SMP replies to the new SSP by transmitting a current journal entry number "N" for the naming network. Afterwards, at step 86, the SSP queries the SMP for each transaction, in order, from journal entry number "1" to journal entry number "N". Then, at step 88, the SMP delivers the transactions in sequence to the SSP. Afterwards, at step 90, the SSP applies the transactions and performs the configuration steps associated with the transactions in real time. One non-limiting example of a real time transaction is copying custom voice prompts. When the SSP reaches the current configuration transaction number, as illustrated by step 92, the SSP may be placed into service.

Figure 9A:
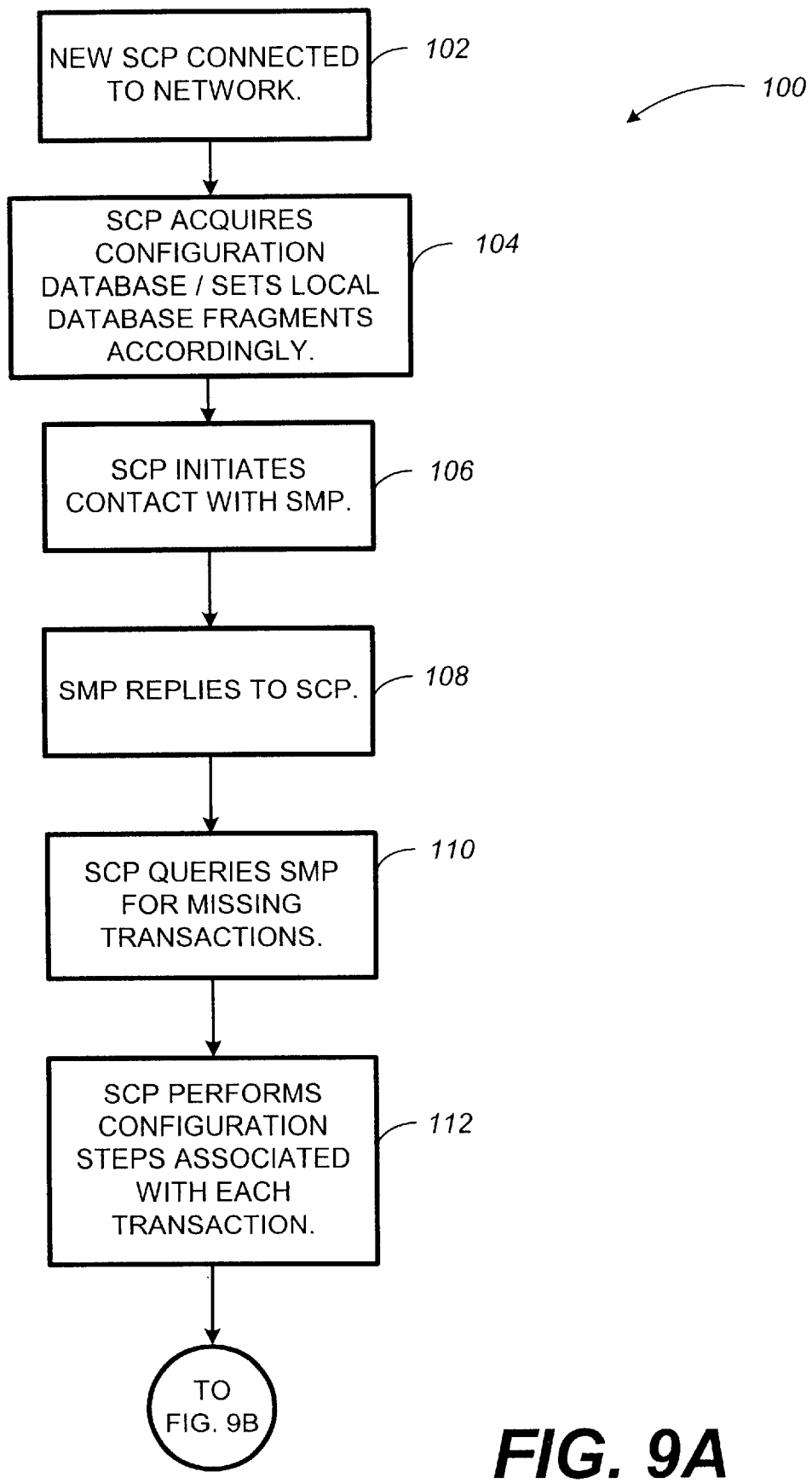
FIGS. 9A and 9B together illustrate a flowchart for adding a service control point that may be integrated in either of the transactional network topologies of FIGS. 3–5.
Figure 9B:
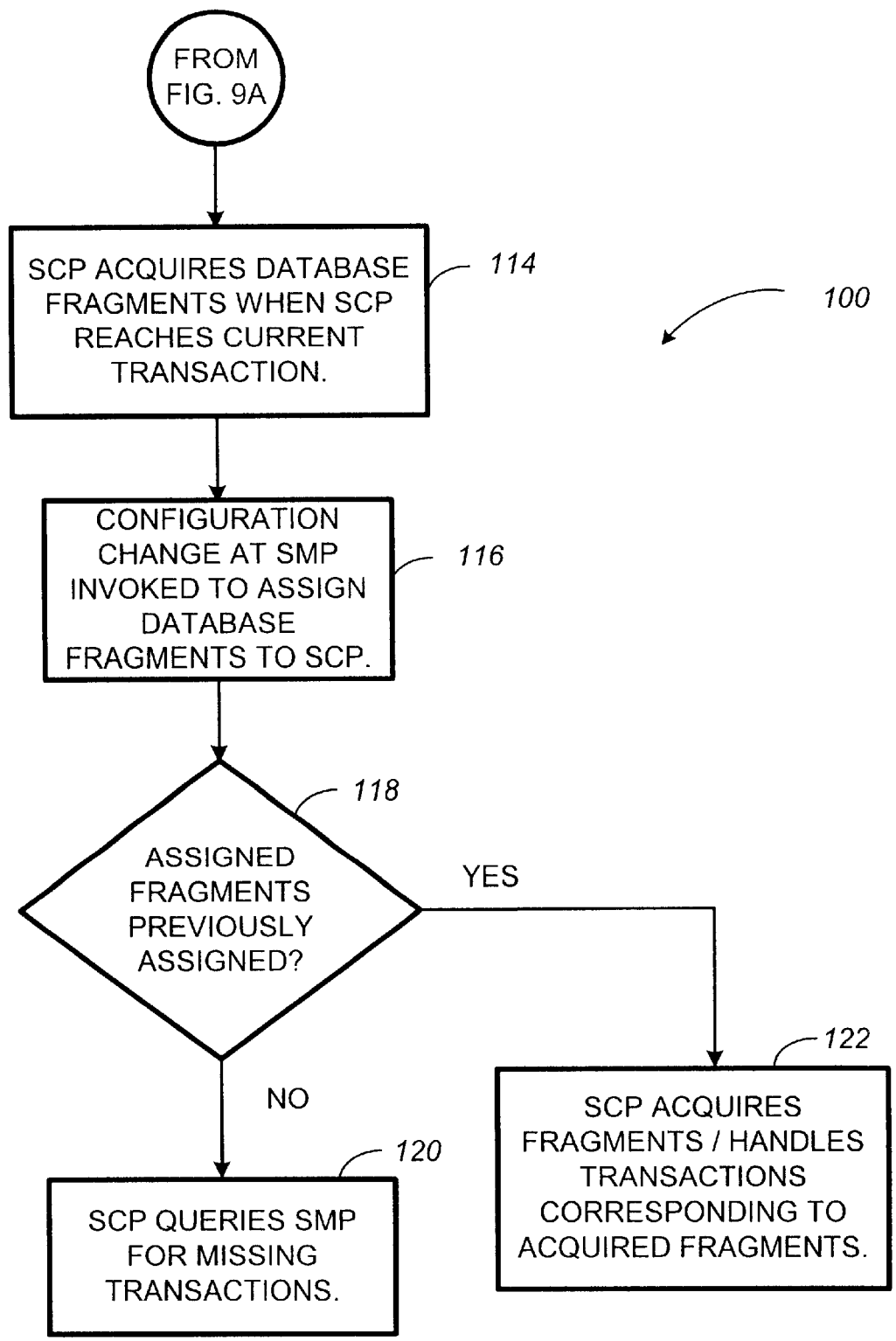

Having described a method for configuring a new SSP 80 with regard to the flowchart of FIG. 8, reference is now directed to FIGS. 9A and 9B. In this regard, FIGS. 9a and 9B introduce a method via a flowchart for adding a new SCP that may be integrated with the transaction network topologies of FIGS. 3–5.

Referring now to FIGS. 9A and 9B, a method for adding SCPs (database servers) to the dynamic transaction network is shown. Initially, at step 102, the new SCP (that may be without a network configuration record) is connected to the network. Next, at step 104, the new SCP may acquire a configuration database and configure local database fragments based on the existing configuration provided by the configuration database. Afterwards, at step 106, the new SCP may initiate contact with the SMP by transmitting a journal entry number of zero to the SMP. A journal entry number of zero indicates that the new SCP does not have a configuration. The SMP, at step 108, may reply to the new SCP with the current journal entry number "N" for the transaction network. Next, at step 110, the SCP may query the SMP for each transaction, in order, from journal entry number "1" to journal entry number "N." Afterwards, at step 112, the SCP may apply the missing transactions and perform the configuration steps associated with the transactions in real time. One example of a real time transaction is copying custom voice prompts, as previously discussed. As illustrated in FIG. 9A processing associated with adding a new SCP to the transaction network continues with FIG. 9B.

When the SCP reaches the current configuration transaction number as may be determined by the SMP's CJN, at step 114, the SCP may begin to acquire database fragments. Depending upon the initial configuration, the SCP may have no logical fragments. If this is the case, at step 116, a configuration change at the SMP may be invoked to assign logical fragments to the new SCP. The new SCP, at step 118, may be configured to determine whether the assigned fragments were previously assigned to existing SCPs. This determination step may be made to evaluate whether a migration of a fragment from another SCP to the new SCP is required. If the assigned fragment was not previously assigned, the new SCP, at step 120, may be configured to handle any transactions corresponding to the fragment. If the query of step 118 determines that an assigned fragment was previously assigned, then an acquire fragment operation is initiated, as illustrated in step 122, and the new or target SCP may immediately begin to handle transactions for the assigned fragment. If the fragment is in the process of being acquired, transaction requests for fragment records not already acquired may be forwarded to the previous fragment owner or source SCP (which recognizes that there is a new fragment owner or target SCP). The source SCP's response to the forwarded transactions may then be transmitted back to the original requestor. The target SCP may then acquire previously assigned fragment entries by polling the previously responsible SCP for each record and marking each record for deletion from the source SCP as the target SCP progresses through the logical fragments.

Figure 10:
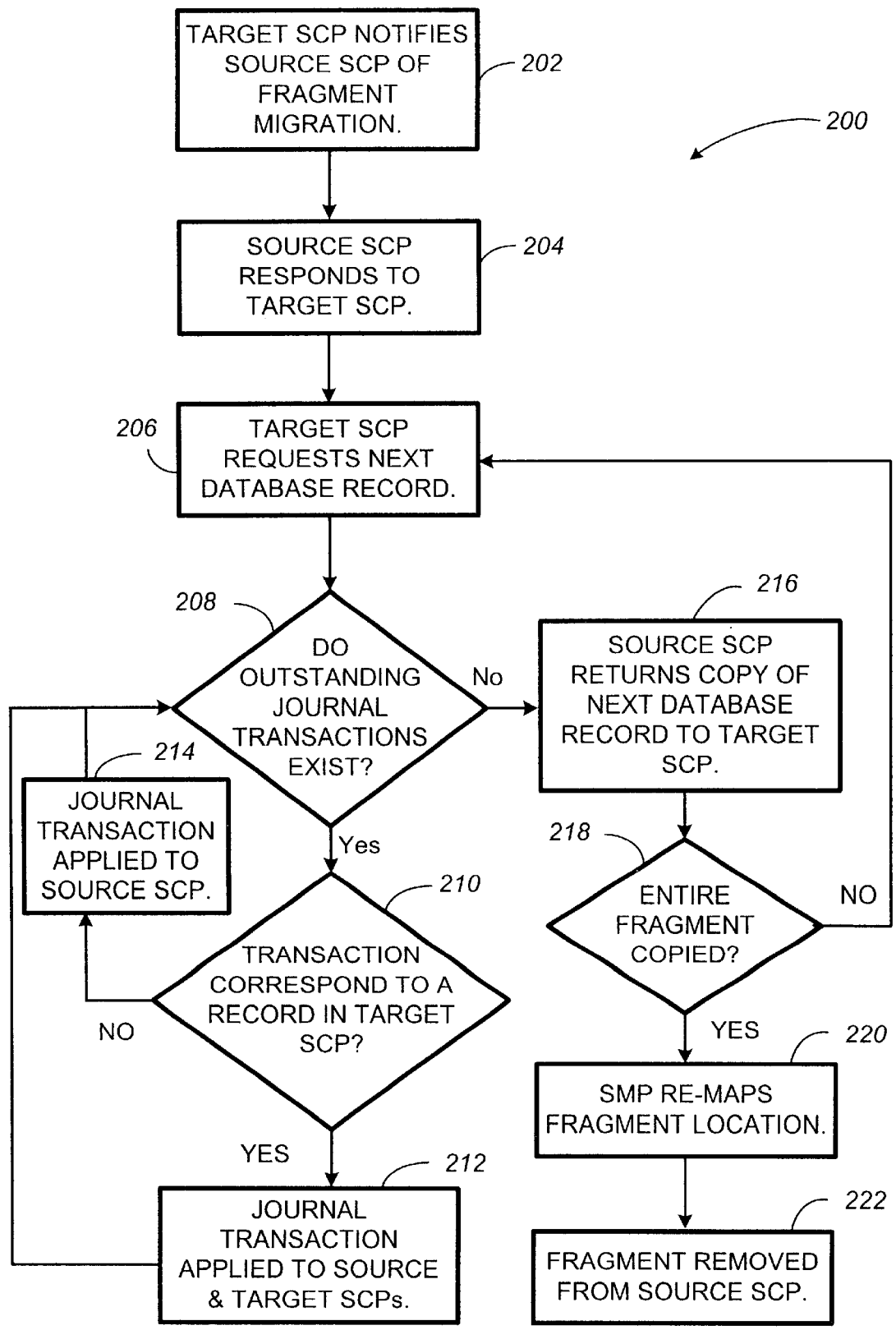
FIG. 10 is a flowchart illustrating an alternative method for database fragment migration across the multiple database servers that may comprise a transactional network topology as introduced in FIGS. 4 and 5.

Having described a method for adding a new SCP 100 with regard to the flowchart of FIGS. 9A and 9B, reference is now directed to FIG. 10. In this regard, FIG. 10 illustrates an alternative method for fragment migration from one SCP to another via the transaction network topologies of FIGS. 3–5.

Referring now to FIG. 10, an alternative method for database fragment migration across the multiple database servers (SCPs) 200 that may comprise a transaction network as configured in FIGS. 4 and 5 is shown. Initially, at step 202, the target SCP may notify the source SCP of the migration of a database fragment (e.g., fragment 3). Next, at step 204, the source SCP may respond to the target SCP by providing the target SCP with a journal entry number (e.g., 1003) and a copy of the first database record in the migrating database fragment. After the target SCP receives the first database record, the target SCP, at step 206, may request the next database record for the migrating database fragment. Before sending a copy of the next database record, the source SCP, at step 208, may determine if there are any outstanding journal transactions (e.g., 1004, 1005, etc.). If there are outstanding journal transactions, the target SCP, at step 210, is checked to determine if it has copied a database record that corresponds to an outstanding journal transaction. If the target SCP does not contain a corresponding database record, the journal transaction, at step 214, may be applied to the source SCP, and processing may return to step 208 to determine if there are additional outstanding journal transactions. If the target SCP contains a corresponding database record, the journal transaction, at step 212, may be applied to the source and target SCPs before returning to step 208 as illustrated in FIG. 10. It should be noted that this method ensures that the source and target SCPs contain identical copies of a database fragment after the database fragment migration is completed. It should also be noted that the source SCP is on-line through the migration procedure and if, during the migration procedure, the source SCP or the target SCP fail for any reason, the migration procedure can be restarted from the last transaction copied.

If there are no outstanding journal transactions, the source SCP, at step 216, may return a copy of the next database record to the target SCP. Next, at step 218, the target SCP may be configured to determine if the entire database fragment has been copied. If not, the target SCP, at step 206, may request the next database record. If it is determined in step 218 that the entire database fragment has been successfully copied, the SMP, at step 220, may re-map the location of the fragment from the source SCP to the target SCP. Afterwards, at step 222, the database fragment may be removed from the source SCP.

It should be noted that any number of fragments might be referenced. It is solely up to the DTL to determine what the "fragment number" to use should be. Since the DTL can be replaced on the fly (as described below), fragment name space can be expanded or contracted during operation of the system. Thus any limitations on the number of database fragments would be derived from the number of addressable network end points.

Furthermore, the number of transactions per second enabled for the entire network can be quite massive. Since only the number of available SCPs and addressable fragments limits the number of SSPs, the number of SSPs is also equal to the number of addressable network end points. Thus, the total theoretical throughput of a system implemented using the structure and function of the present invention is highly scalable and virtually limitless.

However, the speed with which configuration changes are accommodated may be more of a limiting factor on total system throughput. Nonetheless, a nested configuration hierarchy is preferably included to provide further configuration transaction throughput. To minimize configuration transactions, the nested configuration hierarchy may permit the forwarding of configuration changes to SSPs and SCPs only as required. When an SSP needs to perform a transaction (e.g., check and update a balance for a particular calling card), the SSP will execute its DTL logic, using the on-line transaction processing technique described below, to determine which logical fragment to use for the transaction. If the selected logical fragment has an "active" service state, then a transaction request may be created and sent to the SCP currently managing the logical fragment. The managing SCP then may directly communicate with the requesting SSP to respond to the transaction request.

Figure 11:
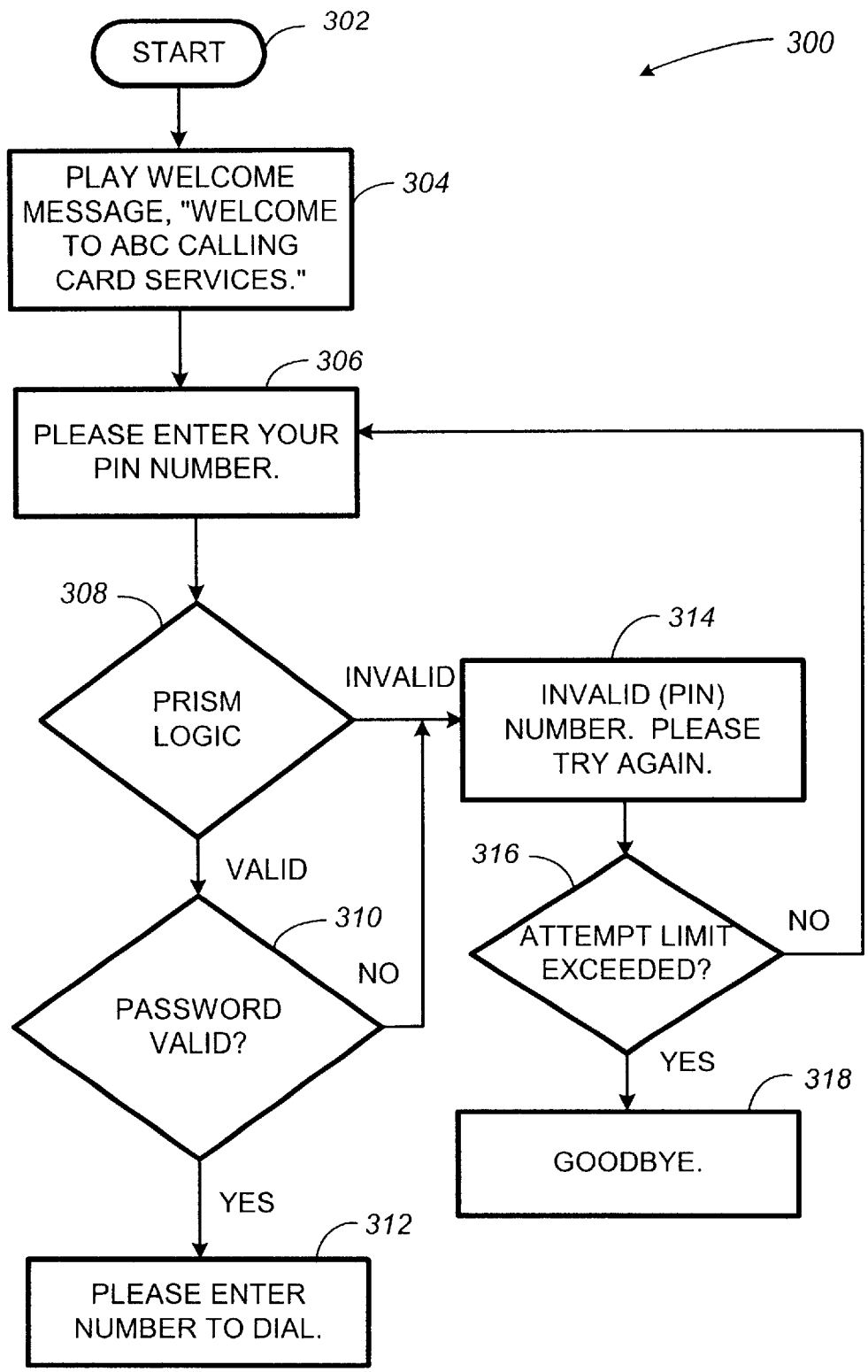
FIG. 11 is a flowchart illustrating calling card transaction flow in a transactional network of FIGS. 4 and 5.
Figure 12:
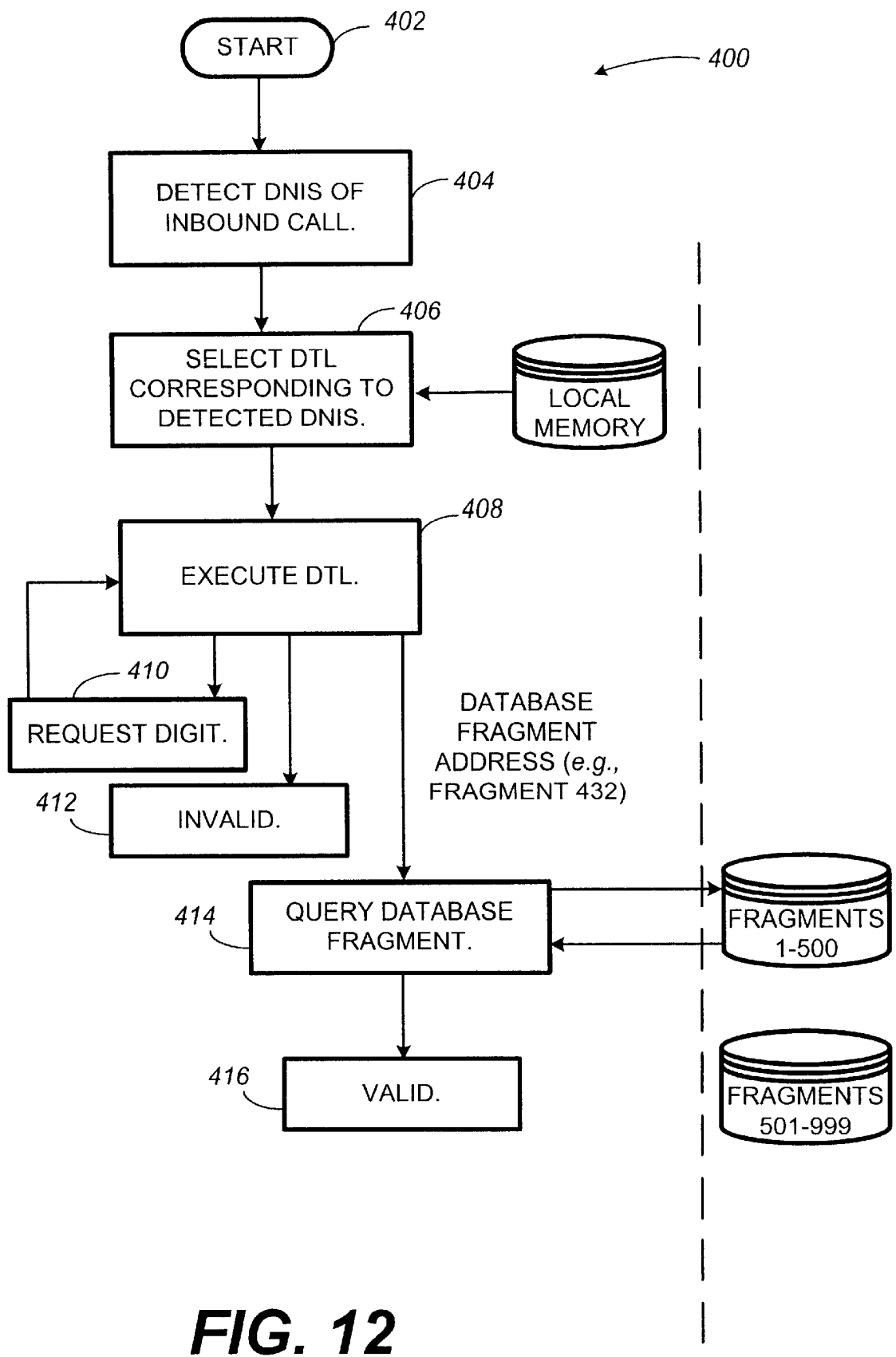
FIG. 12 is a flowchart illustrating operation of the dynamic transportable logic of FIG. 2 in processing a calling card transaction.
Figure 13:
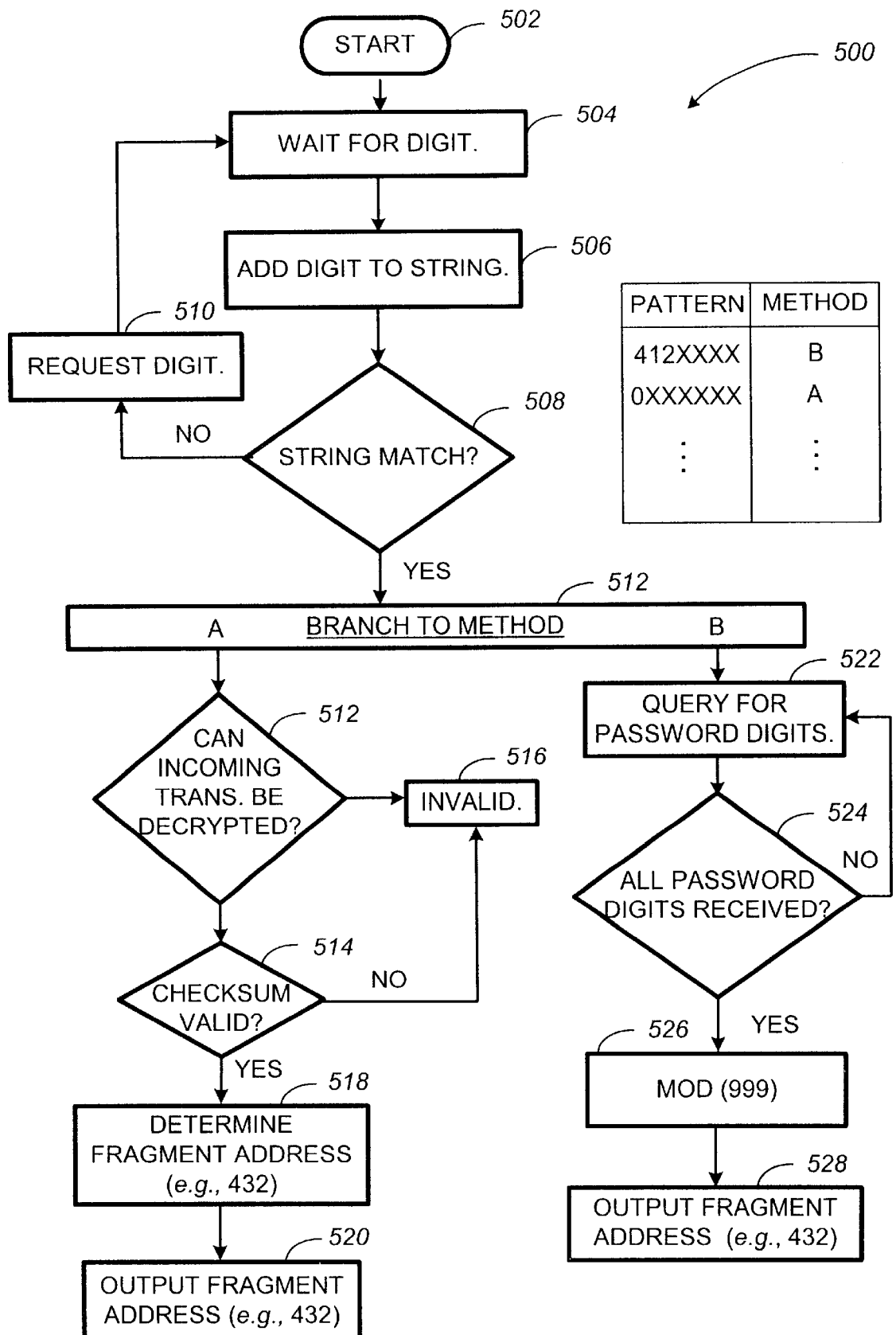
FIG. 13 is a flowchart further illustrating execution of the dynamic transportable logic of FIG. 2 in a transactional network of FIGS. 4 and 5.

Turning now to On-Line Transaction Processing (OLTP), the remaining FIGS. 11–13 illustrate calling card transaction flow, operation and execution of the DTL in a multi-SMP transaction network such as those previously introduced and described with regards to FIGS. 4 and 5.

Referring now to FIG. 11, a flowchart illustrating a method for processing a calling card transaction 300 in a multi-SMP transaction network of FIGS. 4 and 5 is presented. In this regard, the method for processing a calling card transaction 300 begins with step 302, herein designated as "start." Next, in step 304, an SSP may receive an incoming call. The SSP may respond to the incoming call by playing a welcome message. Having welcomed the caller with a voice message as indicated in step 304, the SSP may prompt the caller, as indicated in step 306 for the caller's PIN. After receiving the PIN number, the SSP may be configured to transmit the various incoming call characteristics (including the PIN number) to its prism logic. Next, if the prism logic as illustrated by step 308 determines that the entered PIN number is invalid, the SSP, at step 314, may be configured to inform the caller that the entered number is invalid. As illustrated in FIG. 11, the method may return to step 306, where the SSP may prompt the user to re-enter the PIN number. As further illustrated in FIG. 11, the SSP may be further configured to log the number of user attempts to enter a valid PIN. As illustrated by the query of step 316, the SSP may be configured to branch to step 318, where a goodbye message (and subsequently may disconnect the caller) may be executed. If the prism logic (of step 308 ) determines that the PIN number is valid, the SSP, at step 310, evaluates the password entered by the caller. If the password is invalid, the SSP, at step 314, may be configured to inform the caller that the entered password is invalid and, as previously explained, may prompt the user to re-enter the password. Otherwise, if the SSP, at step 310, determines that the password is valid, the method may continue as illustrated in step 312 by prompting the caller to enter a number to dial. Those skilled in the art will appreciate that the SSP may work in conjunction with the public switched telephone network and or other private networks to complete the voice connection between the caller and the intended destination number in a manner that is well known and need not be described herein to appreciate the present invention.

Having described a method for processing a calling card transaction 300 with regard to the flowchart of FIG. 11, reference is now directed to FIG. 12. In this regard, FIG. 12 is a flowchart illustrating DTL functionality in processing a calling card transaction.

Referring now to FIG. 12, a method for processing a calling card transaction 400 may begin with step 402, herein designated as "start." Next, in step 404, the DTL within the corresponding SSP may receive a plurality of incoming call characteristics as previously described hereinabove. Next, at step 404, the DTL may detect the DNIS of the inbound call and, at step 406, may select the DTL corresponding to the DNIS from a local memory in communication with the SSP. As previously described, the SSP local memory may be periodically updated by the SMP. Once the corresponding DTL has been selected, the SSP may be configured, as illustrated in step 408, to execute the DTL. The DTL may be configured to derive the location of a database fragment from the various call characteristics (e.g., DNIS, ANI, OCN, PIN, or password) of an incoming call. These characteristics are typically represented by a string of digits. If the DTL does not have a complete string of digits, then the DTL, at step 410, may be configured to generate a request for an additional digit. If the DTL has a complete string of digits and determines that the transaction request is invalid as illustrated in step 412, then the DTL generates an invalid signal to the SSP. Otherwise, if the SSP derives the location of the database fragment, then the SSP outputs the address of the fragment over the network where it can be accepted and processed by the appropriate SCP. After the DTL receives the database fragment address, the SSP, at step 414, queries the relevant database and may receive the information stored on the database fragment (e.g., a calling card balance.) If the DTL determines that the received information permits the caller to make a call, then the DTL, at step 416, may be configured to generate a valid signal to the SSP.

It is important to note that the DTL operating within a SSP may identify a database fragment located within a SCP in communication with the multi-SMP transaction network of FIGS. 4 and 5.

Having briefly described a method for processing a calling card transaction 400 with regard to FIG. 12, reference is now directed to FIG. 13. In this regard, FIG. 13 is a flowchart further illustrating execution of DTL in a multi-SMP transaction network of FIGS. 4 and 5.

Referring now to FIG. 13, a method for executing DTL 500 in a multi-SMP transaction network in accordance with the present invention is shown. The method for executing DTL 500 may begin as illustrated with step 502, herein designated as "start." Next, the SSP may begin to receive a string of digits from DTL. The DTL may be configured to wait for a digit, at step 504, and add received digits to a string, at step 506. Next, at step 508, the DTL may be configured to determine if the digit string matches a digit pattern stored in the pattern/method table. If the string does not match a stored digit pattern, the DTL, at step 510, may be configured to request an additional digit, and at step 504, wait for the requested digit. If the digit string matches a stored digit pattern, the DTL, at step 512, may be configured to branch to a stored method of call control corresponding to the matching digit pattern.

If the DTL branches to method "A", the DTL, at step 512, may be configured to make a determination if the incoming transaction may be decrypted. If the DTL is unable to decrypt the transaction request, the DTL, at step 516, may be configured to generate and transmit an invalid signal to the SSP. If the DTL successfully decrypts the transaction request, the SSP, at step 514, may be configured to determine whether the checksum is valid. If the checksum is invalid, the SSP, at step 516, may be configured to generate and transmit an invalid signal as described hereinabove. If the checksum is valid the SSP, at step 518, may be configured to derive the database fragment address corresponding to the transaction request and, at step 520, may be configured to output the fragment address to DTL.

Otherwise, if the DTL branches to method "B", the DTL, at step 522, may query the caller, via the SSP, for password digits. Alternatively, the DTL may detect a password portion of the incoming call characteristics. Next, at step 524, the DTL may be configured to determine whether a complete password is received. If the password is only partially received, the DTL may return to step 522 to query the caller for additional digits. If the complete password is received, the DTL transmits the password to the SSP which, in turn, determines if the password is valid. Turning now to step 526, the SSP may derive the database fragment address corresponding to the transaction request by dividing the PIN number by an integer, such as 999, and using the remainder to identify the relevant database fragment address. A number of alternate algorithms may be used to determine the fragment address from the PIN number, as defined in the DTL logic. Next, at step 528, the SSP may output the database fragment address to the DTL.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A dynamic transaction network comprising:
a first network branch having an at least one system management point containing transportable logic that facilitates access to the dynamic transaction network, an at least one service control point having at least one fragment stored therein, and an at least one service switching point, wherein the at least one system management point is communicatively coupled with both the at least one service control point and the at least one service switching point through a communications medium, the at least one system management point configured to distribute and update a first network branch configuration to the at least one service control point and the at least one service switching point, the at least one service switching point accessing the at least one fragment in response to a transaction request from a user; and a second network branch having an at least one system management point containing transportable logic that facilitates access to the dynamic transaction network, an at least one service control point having at least one fragment stored therein, and an at least one service switching point, wherein the at least one system management point is communicatively coupled with both the at least one service control point and the at least one service switching point through a communications medium, the at least one system management point configured to distribute and update a first network branch configuration to the at least one service control point and the at least one service switching point, the at least one service switching point accessing the at least one fragment in response to a transaction request from a user.

2. The network of claim 1, wherein each respective system management point updates the transportable logic stored therein and throughout its respective network branch in response to a change in the dynamic transaction network.

3. The network of claim 2, wherein the change in the dynamic transaction network is an addition of a service switching point to the dynamic transaction network.

4. The network of claim 2, wherein the change in the dynamic transaction network is a removal of a service switching point from the dynamic transaction network.

5. The network of claim 2, wherein the change in the dynamic transaction network is an addition of a service control point to the dynamic transaction network.

6. The network of claim 2, wherein the change in the dynamic transaction network is a removal of a service control point from the dynamic transaction network.

7. The network of claim 2, wherein the change in the dynamic transaction network is an addition of a fragment to a service control point within the dynamic transaction network.

8. The network of claim 2, wherein the change in the dynamic transaction network is a removal of a fragment from a service control point within the dynamic transaction network.

9. The network of claim 2, wherein the change in the dynamic transaction network is a migration of a fragment from a first service control point to a second service control point within the dynamic transaction network.

10. The network of claim 2, wherein the at least one service switching point within each respective network branch replaces the transportable logic stored therein with the transportable logic stored within a respective system management point in response to a determination that there is a difference between the transportable logic stored therein and the transportable logic stored within the respective system management point.

11. The network of claim 10, wherein the determination that there is a difference between the transportable logic stored within the at least one service switching point and the transportable logic stored within the respective system management point is performed by the at least one service switching point after a comparison of a configuration journal number stored within the at least one service switching point and the respective system management point.

12. The network of claim 2, wherein the at least one service control point within each respective network branch replaces the transportable logic stored therein with the transportable logic stored within a respective system management point in response to a determination that there is a difference between the transportable logic stored therein and the transportable logic stored within the respective system management point.

13. The network of claim 12, wherein the determination that there is a difference between the transportable logic stored within the at least one service control point and the transportable logic stored within the respective system management point is performed by the at least one service control point after a comparison of a configuration journal number stored within the at least one service control point and the respective system management point.

14. The network of claim 1, wherein the network is configured to support a pre-paid calling card (PPCC) service.

15. The network of claim 1, wherein the at least one service switching point is configured to locate an at least one fragment corresponding to the transaction request in response to an input derived from information within the transaction request.

16. The network of claim 15, wherein the input is an identifier associated with the type of service switching point that processed the transaction request.

17. The network of claim 16, wherein the transportable logic provides a database key for accessing the located fragment.

18. The network of claim 15, wherein the input is selected from the group consisting of an automatic number identification (ANI), a dialed number identification system (DNIS), an originally called number (OCN), a redirect number, a personal identification number (PIN), and an account number.

19. The network of claim 15, wherein the input is derived via voice processing.

20. The network of claim 19, wherein the input is selected from the group consisting of a personal identification number (PIN) and an account number.

21. The network of claim 15, wherein the input is derived via dual tone multi-frequency signals.

22. The network of claim 21, wherein the input is selected from the group consisting of a personal identification number (PIN) and an account number.

23. The network of claim 15, wherein the input is an address of a terminal port that processed the transaction request.

24. The network of claim 15, wherein the input is a time of day associated with the transaction request.

25. The network of claim 15, wherein the input is a terminal identifier associated with the type of terminal that processed the transaction request.

26. A method for initializing a distributed, scalable, dynamic transaction network comprising:

connecting at least one management station, at least one database and at least one terminal through a communications medium;

identifying each host on the dynamic transaction network with the at least one management station;

updating a network configuration stored by the at least one management station in response to the identified hosts; and using a transportable logic to notify network hosts of network configuration changes in response to a determination that the network configuration stored by the management station is different from a network configuration as stored by a network host selected from the group consisting of at least one database and at least one terminal.

27. The method of claim 26, wherein the management station has access to a copy of the last known network configuration.

28. The method of claim 26, wherein the transportable logic determines that a network configuration change has occurred by comparing a configuration journal number from the at least one management station and a network host.

29. The method of claim 26, wherein each network host is configured to periodically notify the at least one management station of its present status.

30. The method of claim 29, wherein a host present status comprises an active indicator and a configuration journal number.

31. The method of claim 30, wherein a host comprising at least one database further periodically notifies the at least one management station which fragments are served on the at least one database.

32. The method of claim 31, wherein the at least one database further periodically notifies the at least one terminal which fragments are served on the at least one database.

33. A dynamic transaction network comprising:

means for processing a transaction request;

means for initializing the network such that each host on the network has access to a copy of the current network configuration;

means for adding a database server to the network;

means for adding a terminal to the network; and means for transferring fragments from a first database server to a second database server on the network;

wherein said means for processing a transaction request is configured for simultaneous operation with selected of the aforementioned means for initializing, means for adding a database, means for adding a terminal, and means for transferring fragments.

34. A method for migrating a fragment in a distributed, scalable, dynamic transaction network comprising:

notifying a source database comprising at least one fragment identified for migration that a target database has requested the at least one fragment;

using the source database to respond with a configuration journal number and a copy of the first record in the at least one fragment;

verifying that the no outstanding configuration journal entries exist;

applying configuration changes if an outstanding configuration journal entry is discovered;

verifying that the at least one fragment corresponds to an outstanding transaction request;

copying a record from the source database to the target database;

determining if all records comprising the at least one fragment have been copied to the target database, otherwise repeating the step of copying; and re-mapping the location of the at least one fragment as it is stored throughout the various hosts on the network.

35. The method of claim 34, further comprising:
removing the at least one fragment from the source database.

36. The method of claim 34, further comprising:
keeping the source database on-line during the fragment migration.

37. The method of claim 34, further comprising:
repeating the entire fragment migration process in response to a determination that the entire at least one fragment has not been successfully transferred to the target database.

* * * * *